Aug. 23, 1955   W. G. NEILD   2,716,213
STABILIZING CIRCUIT FOR A. C. REGULATOR
Filed May 27, 1954
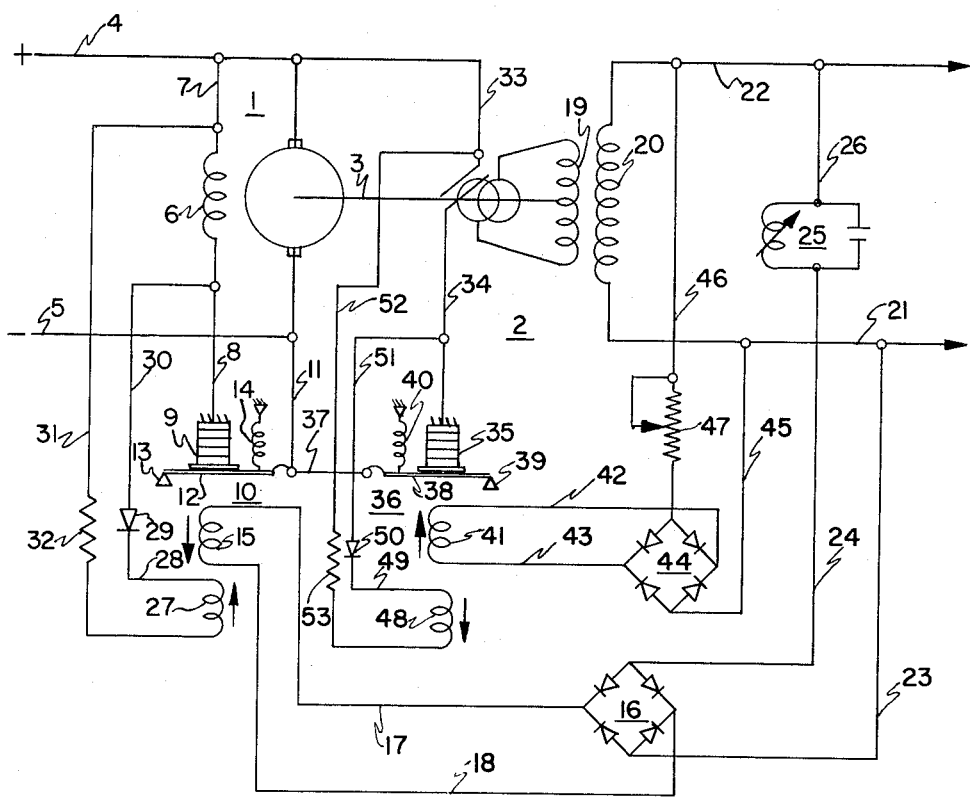
INVENTOR.
WILLIAM G. NEILD
BY

United States Patent Office 2,716,213
Patented Aug. 23, 1955

2,716,213

STABILIZING CIRCUIT FOR A. C. REGULATOR

William G. Neild, Fair Haven, N. J., assignor to Bendix Aviation Corporation, Eatontown, N. J., a corporation of Delaware Application May 27, 1954, Serial No. 432,698

4 Claims. (Cl. 322—19)

The present invention relates to electrical regulating systems and more particularly to improving the stability of electrical regulating systems.

Electrical regulators are used to control a function of a dynamotorelectric machine. In some applications there is a tendency for the regulator to go unstable and "hunt" when the load is suddenly changed. Some means are necessary to provide stability in the regulating system. For example, A. C. regulators, in general, control the output of alternating current generators, usually voltage and frequency. Heretofore, A. C. regulators have been stabilized by the use of stabilizing transformers, one leg of which is connected across the control field and the other leg is connected in series with the regulator control coil. In some applications, the size and weight of the stabilizing transformer are objectionable.

The present invention provides a stabilizing circuit which utilizes a rectifier and a stabilizer coil on the regulator. This arrangement provides stabilization and requires considerably less space than a transformer. Also there is a considerable saving in weight. In applications, such for example, as in aircraft, size and weight are of the utmost importance.

It is an object of the invention to provide an improved regulator system.

Another object of the invention is to provide an improved stabilization circuit for a regulator.

Another object of the invention is to provide a novel regulator system that will result in a saving in size and weight in the system.

The above and other objects and features of the invention will appear more fully hereinafter from a consideration of the following description taken in connection with the accompanying drawing wherein one embodiment of the invention is illustrated by way of example.

The single figure of the drawing is a diagrammatic representation of a voltage and frequency regulating system embodying the invention.

Referring now to the drawing, there is indicated by the numeral 1, a motor which drives an A. C. generator 2 through a shaft 3. The motor 1 is illustrated as a direct current motor deriving electrical energy from a suitable D. C. source (not shown) through conductors 4 and 5. The motor 1 has a shunt field 6 whose flux determines the speed of the motor 1. One end of the field 6 is connected by conductor 7 to the conductor 4, while the opposite end of the field 6 is connected by a conductor 8 to one end of a variable resistance carbon pile element 9 of a regulator indicated generally by the numeral 10. The opposite end of the carbon pile 9 is connected by a conductor 11 to the conductor 5.

The carbon pile element 9 is included in the circuit of the shunt field winding 6 so as to vary the energizing current of the winding 6 and hence the speed of the motor 1. The speed of the motor 1 increases with a decrease in the excitation of the winding 6 and the speed decreases with an increase in the excitation thereof.

The regulator 10 is illustrated diagrammatically herein as including an armature 12 pivoted at 13 and biased by a spring 14 in a direction for decreasing the resistance of the carbon pile element 9. Opposing the spring 14 is a main electromagnetic control winding 15. The winding 15 is connected across the output terminals of a rectifier 16 by conductors 17 and 18.

The generator 2 driven by the motor 1 through the shaft 3 may be of the type having a rotating exciting field 19 and a stator winding 20. Output conductors 21 and 22 lead from the stator winding 20 to a suitable load (not shown). It is understood, however, that the generator 2 could be of the type having a stationary exciting field winding and a rotor output winding. Further, the generator 2 may be single phase or multi-phase.

One input terminal of the rectifier 16 is connected by conductor 23 to the output line 21. The other input terminal of the rectifier 16 is connected by conductor 24, tuned circuit 25 and conductor 26 to the output line 22. The tuned circuit 25 is tuned to resonance slightly off from the operating frequency thus permitting operation on the slope of the resonance curve.

In addition to the main winding 15, the regulator 10 has a stabilizing winding 27. One side of the winding 27 is connected by a conductor 28 to one side of a blocking rectifier 29. The other side of the rectifier 29 is connected by a conductor 30 to one side of the winding 6. The other side of the winding 27 is connected by a conductor 31 to the other side of the winding 6. A resistor 32 may be inserted in the conductor 31 to limit the current in the winding 27.

The exciting winding 19 of the generator 2 has one end connected through conventional slip rings and conductor 33 to the conductor 4, while the opposite end is connected through conventional slip rings and conductor 34 to one end of a variable resistance carbon pile element 35 of a regulator indicated generally by the numeral 36. The opposite end of the carbon pile element 35 is connected by a conductor 37 to the conductor 5.

The carbon pile 35 is included in the circuit of the exciting winding 19 of the generator 2 so as to vary the exciting current and hence the output voltage from the generator 2. The output voltage from the generator 2 increases with increase in the excitation of the winding 19 and decreases upon a decrease in the excitation thereof.

The regulator 36 is shown diagrammatically herein as including an armature 38 pivoted at 39 and biased by a spring 40 in a direction for decreasing the resistance of the carbon pile 35. Opposing the spring 40 is a main electro-magnetic control winding 41. The winding 41 is connected by conductors 42 and 43 across the output terminals of a rectifier 44. One input terminal of the rectifier 44 is connected by a conductor 45 to the output line 21. The other input terminal of the rectifier 44 is connected by a conductor 46 to the output line 22. A variable resistor 47 may be inserted in the conductor 46 to regulate the voltage setting of the winding 41.

In addition to the main control winding 41, the regulator 36 has a stabilizing winding 48. One side of the winding 48 is connected by a conductor 49 to one side of a blocking rectifier 50. The other side of the rectifier 50 is connected by a conductor 51 to the conductor 34. The other side of the winding 48 is connected by a conductor 52 to the conductor 33. A resistor 53 may be inserted in the conductor 52 to limit the current in the winding 48.

In operation, the blocking rectifiers 29 and 50 are so connected that no current flows through the respective stabilizing coils 27 and 48 during the normal operation. However, upon a sudden reduction in load, the carbon pile will open due to the increased energization of the main windings of the regulator. The current in the control fields collapses and a voltage is induced in the reverse direction by self induction. The rectifiers permit this voltage to pass current which energizes the stabilizing windings in opposition to the main windings. This speeds up the action of the regulator by permitting the regulator spring to close the pile. Hence it can be seen that the novel arrangement provides stability without affecting the normal operation of the regulator.

Although a carbon pile regulator has been illustrated and described, it is understood that the arrangement would be applicable to other types of regulators.

Although only one embodiment of the invention has been illustrated and described, various changes in the form and relative arrangement of the parts, which will now appear to those skilled in the art, may be made without departing from the scope of the invention.

What is claimed is:

1. In combination, a dynamoelectric machine having and output circuit for producing an electric quantity variable in accordance with an operating condition of said machine, an excitation winding for said machine, a variable resistance element for controlling the excitation of said winding, a main control winding connected across said output circuit for controlling said variable resistance in response to variation in said quantity, a stabilizing winding for said regulator connected across said excitation winding, and a blocking rectifier connected to permit current flow in said stabilizing winding in a direction opposing said main winding.

2. A regulator for controlling a function of a dynamoelectric machine having an excitation winding and an output circuit, comprising a carbon pile resistance element for controlling the energization of said excitation winding, a main control winding and a stabilizing winding, first circuit means for connecting said main control winding across said output circuit, and second circuit means including blocking means for connecting said stabilizing winding across said excitation winding whereby the current flow therein is in opposition to said main winding.

3. Control apparatus for use in a system having an alternating current generator including an exciting winding and driven by an electric motor, comprising frequency regulating means responsive to the output frequency of said generator for controlling the speed of said motor, voltage regulating means including a main control winding responsive to generator voltage, and stabilizing means including a stabilizing winding connected in series with a rectifier across said exciting winding, said rectifier being poled to permit passage of current only in a direction opposing the current in said main winding.

4. Control apparatus for use in a system having an alternating current generator driven by an electric motor of the type having an exciting winding, comprising voltage regulating means responsive to the output voltage of said generator for maintaining said voltage at a predetermined value, frequency regulating means including a main control winding responsive to the output frequency of said generator to control the speed of said motor, and anti-hunting means for said frequency regulating means, said anti-hunting means including uni-directional conducting means and an anti-hunting winding connected in series across said exciting winding and arranged to oppose said main winding.

References Cited in the file of this patent

UNITED STATES PATENTS 1,333,662     Kazenmaier  ----------- Mar. 16, 1920